(12) United States Patent
Page

(10) Patent No.: US 6,674,625 B1
(45) Date of Patent: Jan. 6, 2004

(54) LIGHTNING PROTECTION SYSTEMS

(75) Inventor: J. Dennis Page, Rincon, GA (US)

(73) Assignee: Storm Shelter Corporation, Savannah, GA (US)

( * ) Notice: Subject to any disclaimer, the term of this patent is extended or adjusted under 35 U.S.C. 154(b) by 0 days.

(21) Appl. No.: 09/868,290

(22) PCT Filed: Jan. 5, 2000

(86) PCT No.: PCT/US00/00168

§ 371 (c)(1),
(2), (4) Date: Jun. 15, 2001

(87) PCT Pub. No.: WO00/41286

PCT Pub. Date: Jul. 13, 2000

Related U.S. Application Data

(60) Provisional application No. 60/114,832, filed on Jan. 6, 1999.

(51) Int. Cl.[7] .................................................. H02H 1/00
(52) U.S. Cl. ....................... 361/117; 361/118; 361/111; 361/59; 324/72
(58) Field of Search ................................ 361/119, 111, 361/118, 59; 324/72

(56) References Cited

U.S. PATENT DOCUMENTS

| | | | |
|---|---|---|---|
| 3,970,898 A | * | 7/1976 | Baumann et al. ............. 361/68 |
| 4,176,898 A | | 12/1979 | Marechal |
| 4,433,607 A | * | 2/1984 | Kemeny ......................... 89/8 |
| 4,725,886 A | | 2/1988 | Galumbeck et al. |
| 4,792,806 A | | 12/1988 | Bent et al. |
| 4,914,444 A | | 4/1990 | Pifer et al. |
| 4,916,539 A | | 4/1990 | Galumbeck |
| 5,140,419 A | | 8/1992 | Galumbeck et al. |
| 5,291,208 A | | 3/1994 | Young |
| 5,453,899 A | | 9/1995 | Page |
| 5,521,603 A | | 5/1996 | Young |
| 5,721,659 A | | 2/1998 | Young |
| 5,877,698 A | * | 3/1999 | Kusnier et al. ............. 340/5.92 |
| 5,923,516 A | | 7/1999 | Young |
| 5,959,815 A | * | 9/1999 | Gilbert .......................... 361/1 |
| 6,104,582 A | * | 8/2000 | Cannon et al. ................. 361/1 |
| 6,404,880 B1 | * | 6/2002 | Stevens ................. 379/221.11 |

* cited by examiner

Primary Examiner—Gregory J. Toatley, Jr.
Assistant Examiner—Isabel Rodriguez
(74) Attorney, Agent, or Firm—Kilpatrick Stockton LLP

(57) ABSTRACT

A lightning protection system including a monitoring system (10) for detecting dangerous atmospheric conditions within specific geographic zones, a transmission system (12) for sending control codes, and multiple circuit connection/disconnection devices (16) for electrically connecting to electronic equipment to be protected. The lightning protection system (10) protects electrical and electronic equipment (18) by detecting and locating dangerous atmospheric conditions in a particular geographic area and transmitting broadcast control commands to electrical circuit connection/disconnection devices (16) in the geographic area, which have a receiver for receiving the broadcast control commands and an interruption mechanism (16) for disconnecting and reconnecting the electrical equipment from external conductors in response to the control commands. The monitoring system (10) may consist of multiple detectors located in different geographic areas. The monitoring system (10) may also be external to the region receiving the control commands. In the external monitoring system configuration, a centralized monitoring system detects and locates the dangerous atmospheric conditions and transmits this information to the transmission system. The transmission system then transmits control commands to the electrical circuit connection/disconnection devices.

23 Claims, 6 Drawing Sheets

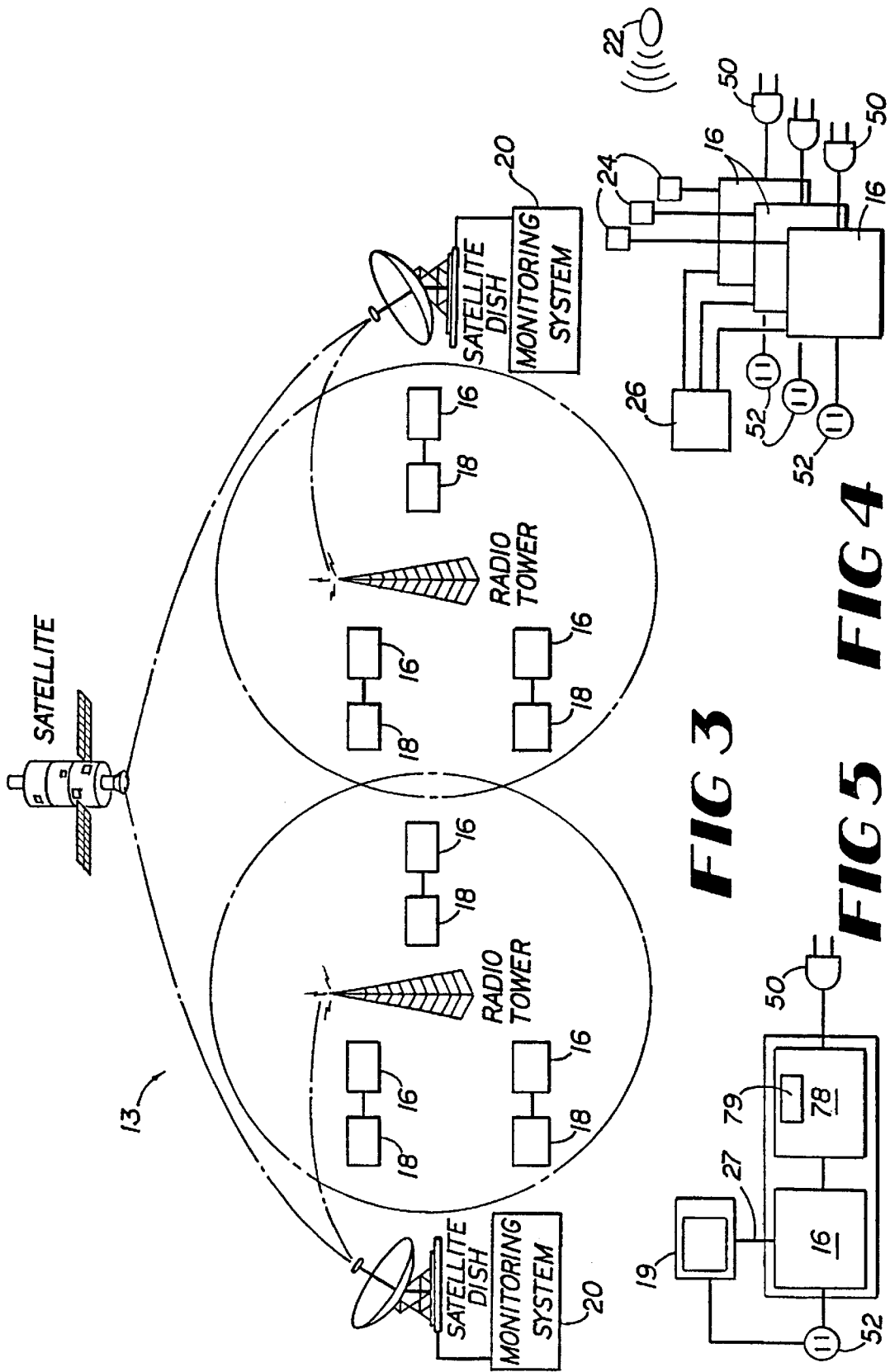

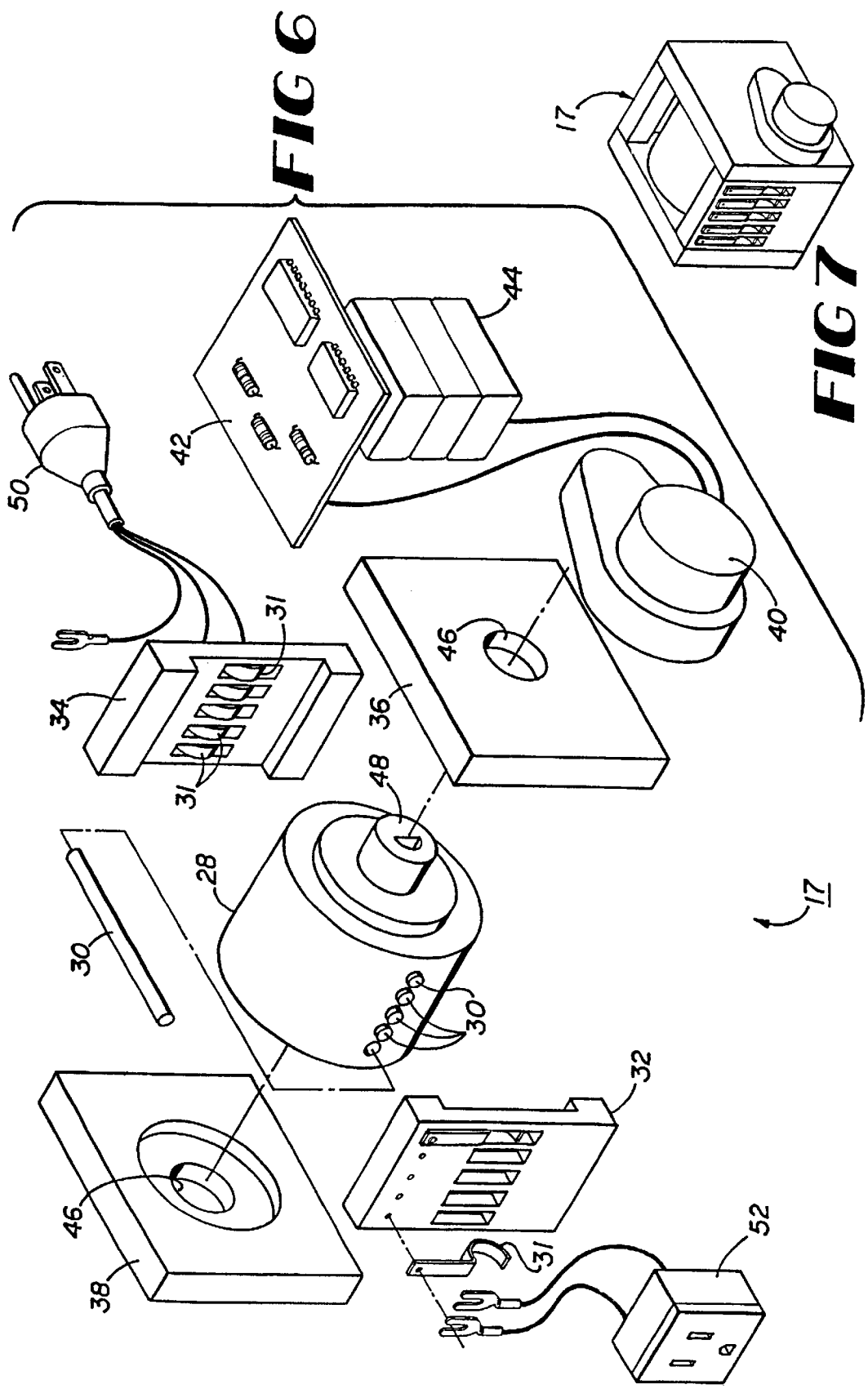

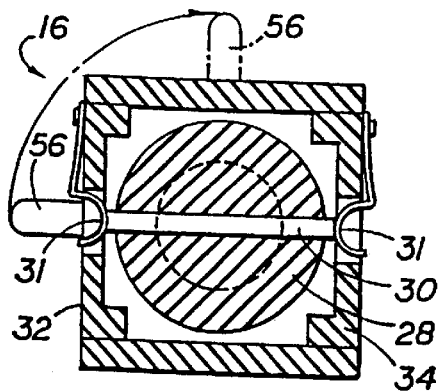
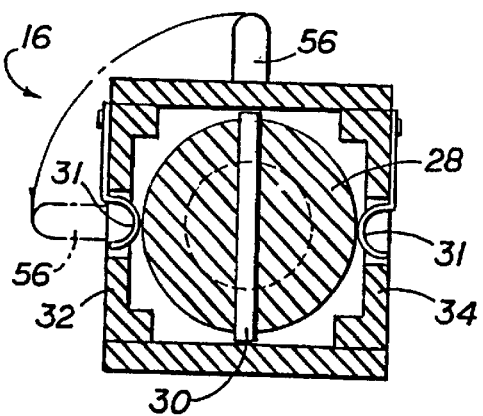
FIG 8    FIG 9
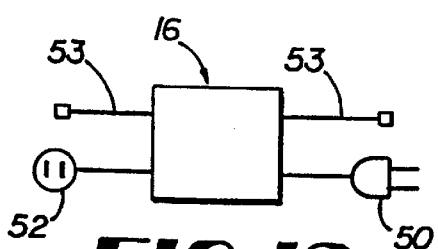
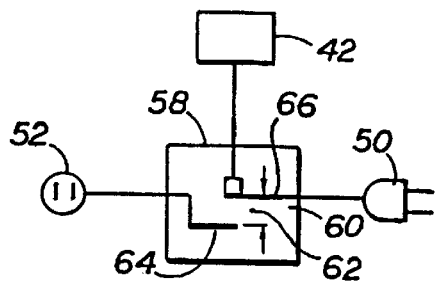
FIG 10    FIG 11
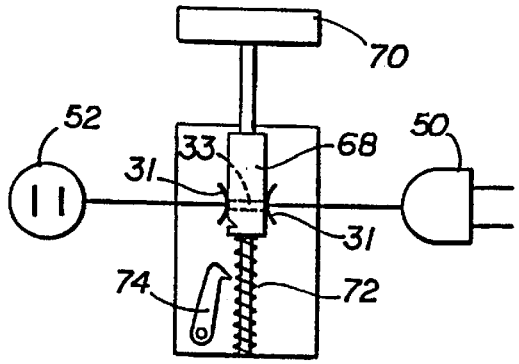
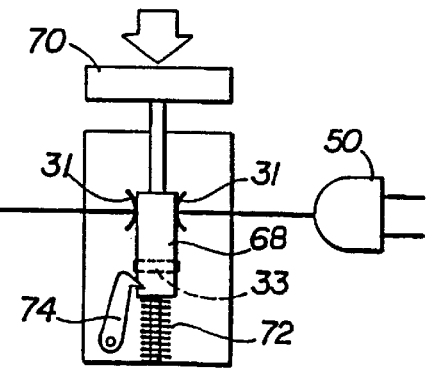
FIG 12    FIG 13
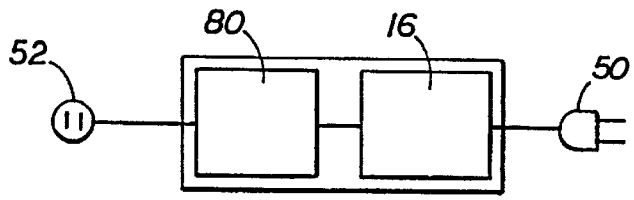
FIG 14

LIGHTNING PROTECTION SYSTEMS

This non-provisional application claims the benefit of provisional application 60/114,832 filed on Jan. 6, 1999.

BACKGROUND OF THE INVENTION

This invention relates to systems and devices for protecting electrical and electronic equipment from the damaging effects of lightning and from other electrical disturbances that are carried to the equipment by external conductors.

Electrical and electronic equipment, particularly electronic equipment using microelectronics, microcircuitry and integrated circuits, are sensitive to electrical surges coming through external electrical conductors such as telephone lines, coaxial cable, digital connections, analog connections, low voltage control lines, and power conductors. These surges may result from lightning strikes or other catastrophic electrical events occurring within the power grid. Various lightning protection devices are available which protect electronic equipment from electrical surges and other undesirable electrical phenomenon. A feature of some of these existing devices is to protect electrical and electronic equipment by disconnecting the equipment from external conductors before any actual surge exists. Generally, the protection devices disconnect the equipment being protected from external conductors in response to a sensor that detects the presence of dangerous atmospheric conditions near the protection device. For example, U.S. Pat. No. 5,453,899 (the "'899 patent") entitled "Lightning Protection Device," which is incorporated herein by this reference, discloses a lightning protection device that physically interrupts the electrical connection between electrical and electronic equipment and the power grid when lightning is detected in the vicinity of the equipment by a radio frequency receiver tuned to a frequency that generates a voltage in response to radio frequency static in the general vicinity. U.S. Pat. No. 5,291,208 entitled "Incipient Lightning Detection and Device Protection," which is incorporated herein by this reference, discloses several other detecting mechanisms for sensing electrical activity in the general vicinity of the device.

An important concern with these prior lightning protection devices is that control of the device is typically limited to detection of dangerous atmospheric conditions such as disclosed in the above-referenced patents. Detection of dangerous atmospheric conditions at the precise location of the protection device may not be sufficient to protect the device from damage. For example, some electronic equipment may be located within structures where relevant radio frequencies are difficult to receive. In addition, because electrical storms tend to cover a large geographic area and tend to move quickly, they are very difficult to track based on one geographical data point. Therefore, sensors located on protection devices may not have the range, sensitivity, or accuracy to detect distant atmospheric conditions that may still damage the equipment being protected. Even if more sensitive sensors were employed, such an approach could be cost prohibitive.

Although lightning protection devices may permit users to manually disconnect equipment from external conductors, this is no different than merely unplugging the equipment. Additionally, commercial users of such devices may be inconvenienced by having to have multiples of such units distributed throughout the building to protect a variety of electronic devices. Likewise, a homeowner may be similarly inconvenienced by having to move about an entire house to trigger multiple devices attached to various outlets.

Another important concern with many prior protection devices is that they may not provide adequate insulation between the electrical and electronic equipment being protected and the external conductors carrying the electrical surges. For example, voltages induced in the wiring of a house by a lightning strike may reach or exceed 6,000 volts before the wiring of the house is destroyed. Thus, the insulative capacity of the protection device must be sufficient to prevent a 6,000 volt charge from crossing the insulative barrier and entering the electrical and electronic equipment being protected.

Furthermore, there are additional electrical events that may damage electrical and electronic equipment that are not diminished or mitigated by the use of a conventional lightning protection device. For example, conventional electrical power supplies often suffer from small surges which can damage circuitry but are not sufficient to trigger interruption by the lightning protection device. Moreover, such interruption might not be desirable if the surges are relatively minor and need only to be attenuated. Also, power interruptions may damage electronic equipment.

Surge protectors are available which attenuate minor variations in power supply. Also, uninterruptable power supplies (UPS) are available which continue to provide power to electrical and electronic equipment for some period of time after a power failure, to allow the benign shut-down of the system. Each of these systems are typically provided independent from lightning protection devices, thereby increasing the cost and complexity of the systems required to provide clean, consistent power to the electronic device.

SUMMARY OF THE INVENTION

This invention is a lightning protection system for effectively and efficiently protecting electrical and electronic equipment from lightning induced electrical surges and other disturbances. The lightning protection system includes a monitoring system for detecting dangerous atmospheric conditions within specific geographic zones, a transmission system for sending control codes, and multiple circuit connection/disconnection devices for electrically connecting to electrical and electronic equipment to be protected. The lightning protection system protects electrical and electronic equipment by detecting and locating dangerous atmospheric conditions in a particular geographic area and transmitting broadcast control commands to electrical circuit connection/disconnection devices in the geographic area, which have a receiver for receiving the broadcast control commands and an interruption mechanism for disconnecting and reconnecting the electrical equipment from external conductors in response to the control commands. The monitoring system may consist of multiple detectors located in different geographic areas. The monitoring system may also be external to the region receiving the control commands. In the external monitoring system configuration, a centralized monitoring system detects and locates the dangerous atmospheric conditions and transmits this information to the transmission system. The transmission system then transmits control commands to the electrical circuit connection/disconnection devices.

To further enhance the protection of the electrical equipment, the electrical circuit connection/disconnection device may also be controlled in a number of other ways. For example, the electrical circuit connection/disconnection device may be manually operated with the use of a "stomp" switch, which manually forces the disconnect process. Alternatively, a remote control may be used permitting the user to remotely activate the electrical circuit connection/ disconnection device via a hand-held remote control unit, computer, modem, the Internet, wire or wireless telephone, home automation system, or any alternative means of remote communication. In a similar manner, multiple electrical circuit connection/disconnection devices may be connected together in a local area or large area network and controlled in a similar, remote manner. Manual triggering of the electrical circuit connection/disconnection devices may be desirable where certain structures interfere with lightning detection, thus rendering automated disconnection impractical; when normal sources of electrical power have failed; where dangerous, non-lightning related voltages may occur; when a user desires to have the protected equipment powered down; and when peace of mind or convenience dictates disconnection of the protected equipment.

Protection of electrical equipment may be further enhanced by enabling the electrical circuit connection/ disconnection device to be controlled by the electrical equipment. Specifically, an electrical circuit connection/ disconnection device may have a sensor that detects the status of the on/off switch of the electronic device. When the electrical equipment being protected is turned off, the electrical circuit connection/disconnection device may automatically sever the connection between the electronic equipment and external conductors, thereby insuring that unanticipated electrical surges will not damage the electronic equipment even if the user is not in the vicinity to manually disconnect the device.

In order to provide effective protection of the electrical equipment, the electrical circuit connection/disconnection device may incorporate a disconnect mechanism with substantial insulative capacity. For example, a rotary block with conductive rods passing therethrough may be used to interrupt the external conductors, such as the power supply, modem lines, cable television lines, computer network lines and any other electrical connections, to the electronic equipment. The material used in the insulating rotary block has sufficient insulative characteristics to prevent excessive voltages from crossing the rotary block. Alternatively, the disconnect mechanism may employ a rotating disk with alternating insulating tabs and spaces to interrupt the external conductors from the electronic equipment. The disconnect mechanism may also employ gas-filled or vacuum relays. The gas or vacuum in the relay is sufficiently insulative to prevent excessive voltages from bridging the gap between the relay elements. Alternatively, the disconnect mechanism may employ a substantial gap of air.

Accordingly, it is a feature of this invention to provide a lightning protection system with an accurate, sensitive, and precise detector capable of detecting and locating dangerous atmospheric conditions.

Another feature of the invention is to provide an intelligent lightning protection system that may detect and locate dangerous atmospheric conditions in a specific geographic area and control electrical circuit connection/disconnection devices within the area.

Another feature of the invention is to provide an improved electrical circuit connection/disconnection device for protecting electrical and electronic equipment from various electrical surges that may be controlled by geographically specific radio broadcasts.

Another feature of the invention is to provide an improved electrical circuit connection/disconnection device for protecting electrical and electronic equipment from various electrical surges, which has a disconnect mechanism with sufficient insulative capacity to prevent even extreme voltage surges from crossing the insulative barrier.

A further feature of the invention is to provide an improved electrical circuit connection/disconnection device for protecting electrical and electronic equipment from various electrical surges in combination with other electrical conditioning devices and/or uninterruptable power supplies in a single compact and inexpensive unit.

Another feature of the invention is to provide an electrical circuit connection/disconnection device for protecting electrical and electronic equipment from various electrical surges, which may be controlled manually.

Another feature of the invention is to provide an improved electrical circuit connection/disconnection device for protecting electrical and electronic equipment from various electrical surges, which may be controlled remotely.

Yet another feature of the invention is to provide an improved electrical circuit connection/disconnection device for protecting electrical and electronic equipment from various electrical surges, which may be controlled remotely and in network fashion.

BRIEF DESCRIPTION OF THE DRAWINGS

FIG. 3 is a schematic diagram of a third embodiment of a lightning protection system of this invention.

FIG. 4 is a schematic diagram of a fourth embodiment of a lightning protection system of this invention.

FIG. 5 is a schematic diagram of an electrical circuit connection/disconnection device usable in the systems of FIGS. 1–4 that also may be controlled based on the power consumption state of the electrical or electronic equipment being protected.

FIG. 6 is an exploded perspective view of an embodiment of a circuit interruption mechanism usable in the systems illustrated in FIGS. 1–5 and other systems.

FIG. 7 is a perspective view of the mechanism shown in FIG. 6.

FIG. 8 is a schematic side elevation view a portion of a mechanism similar to that shown in FIGS. 6 and 7 positioned in a connected state.

FIG. 9 depicts the mechanism shown in FIG. 8 positioned in a disconnected state.

FIG. 10 is a schematic diagram of the external connectivity of an electrical circuit connection/disconnection device usable in the systems of FIGS. 1–5 and other systems.

FIG. 11 is a schematic diagram of an alternative embodiment of a circuit interruption mechanism usable in the systems illustrated in FIGS. 1–5 and other systems.

FIG. 12 is a schematic diagram of another alternative embodiment of a circuit interruption mechanism usable in systems illustrated in FIGS. 1–5 and other systems positioned in a connected state.

FIG. 13 is a schematic diagram of the electrical circuit connection/disconnection device of FIG. 12 positioned in a disconnected state.

FIG. 14. is a schematic diagram of an improved electrical circuit connection/disconnection disconnection device usable in the systems illustrated in FIGS. 1–5 and other systems.

DETAILED DESCRIPTION

Systems

Figure 1:
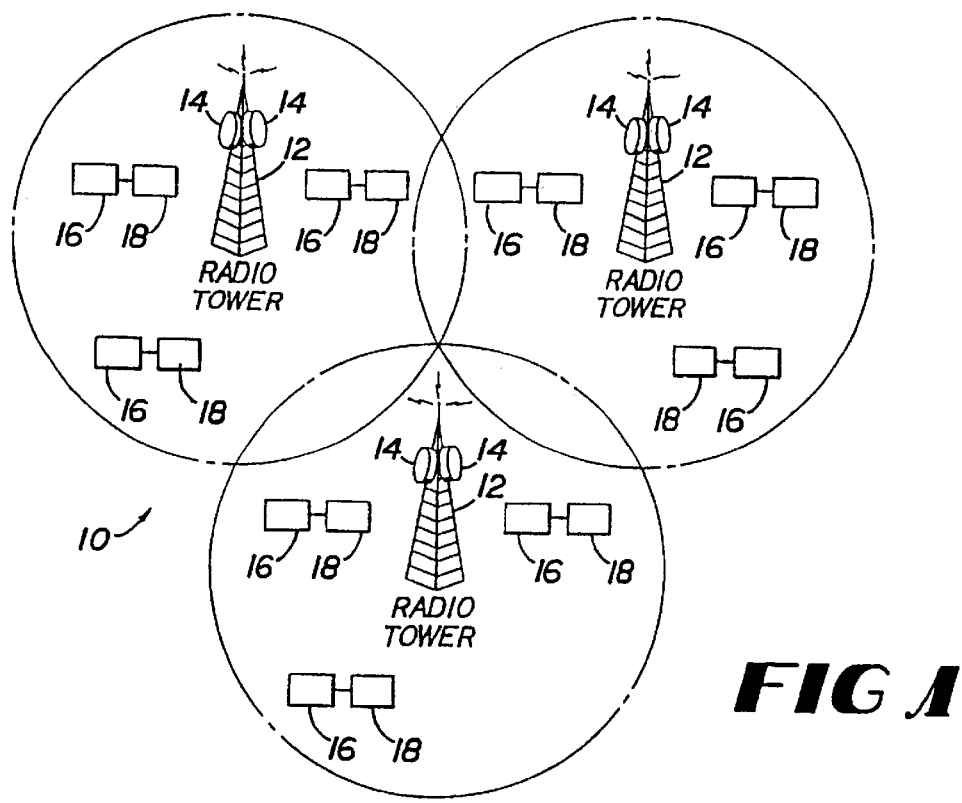
FIG. 1 is a schematic diagram of one embodiment of a lightning protection system of this invention.

FIG. 1 illustrates an embodiment 10 of the lightning protection system of this invention. System 10 may have a plurality of regional broadcast sites or transmitters 12 having regional lightning detectors 14 and a plurality of electrical circuit connection/disconnection devices 16 for protecting electrical and electronic equipment 18. System 10 may protect electrical and electronic equipment 18 by detecting and locating dangerous atmospheric conditions in a particular geographic area using lightning detectors 14 and transmitting broadcast control commands throughout the affected geographic area to devices 16, which disconnect electrical and electronic equipment 18 from all or a portion of external conductors in response to the control commands from regional broadcast transmitters 12. Devices 16 may also provide an audible warning prior to disconnection, which may enable users of devices 16 to override disconnection of devices 16 from electrical and electronic equipment 18. System 10 may also use the control signals to reconnect electrical and electronic equipment 18 to the disconnected external conductors. Since relatively few regional broadcast sites 12 and lightning detectors 14 are needed, it is economically feasible to design each lightning detector 14 to have substantial range, sensitivity, and accuracy for detecting and locating atmospheric conditions. Because electrical circuit connection/disconnection devices 16 need not incorporate their own lightning detectors, each device 16 may be small and inexpensive. Additionally, because central lightning detectors may be of a higher quality than may be affordable for a single user, more accurate control of devices 16 can be achieved.

Devices 16 in system 10 may be assigned a control address based on the location of the device within the geographical area of the lightning protection system. For example, the entire geographical area of system 10 may be divided up into distinct regions with each device 16 in a particular region being assigned the same control address. Although in FIG. 1 each distinct region corresponds to the transmission radius of regional broadcast sites 12. the size and shape of each distinct region and corresponding control address in the lightning protection systems of this invention may be independent of the size and shape of the transmission radius of sites 12. In this manner, devices 16 within each distinct region may be controlled by transmission systems using any cellular, pager or any other suitable communications technology, including future systems not presently available that may transmit common control signals to devices having specific control addresses.

Lightning detectors 14 may be provided on each site 12 to detect lightning activity in the vicinity of the region. Each site 12 broadcasts control signals using a common numerical code, such as, for example, a pager "capcode" or any alternative control command system that may activate only devices 16 within that particular region. Because regional lightning detectors 14 cover relatively small geographic All areas, accurate control over devices 16 is possible. System 10 may also enable devices 16 to receive encoded broadcasts, such as, for example, the NATIONAL WEATHER SERVICE's (a weather monitoring and notification service) Specific Area Message Encoded (SAME) broadcasts or any alternative encoded broadcast, in addition to those controlling the devices 16 to provided redundancy or to provide the user with specific weather information, including weather alarms. Moreover, each of sites 12 and detectors 14 may be linked together to form a network. In this manner, detection data from each of the detectors 14 may be compared to accurately track storm movement and activate devices 16 only in specific danger areas.

As an alternative to the multiple lightning detectors 14 shown in FIG. 1, a centrally located detector within each distinct geographic region could control transmission from sites 12.

Figure 2:
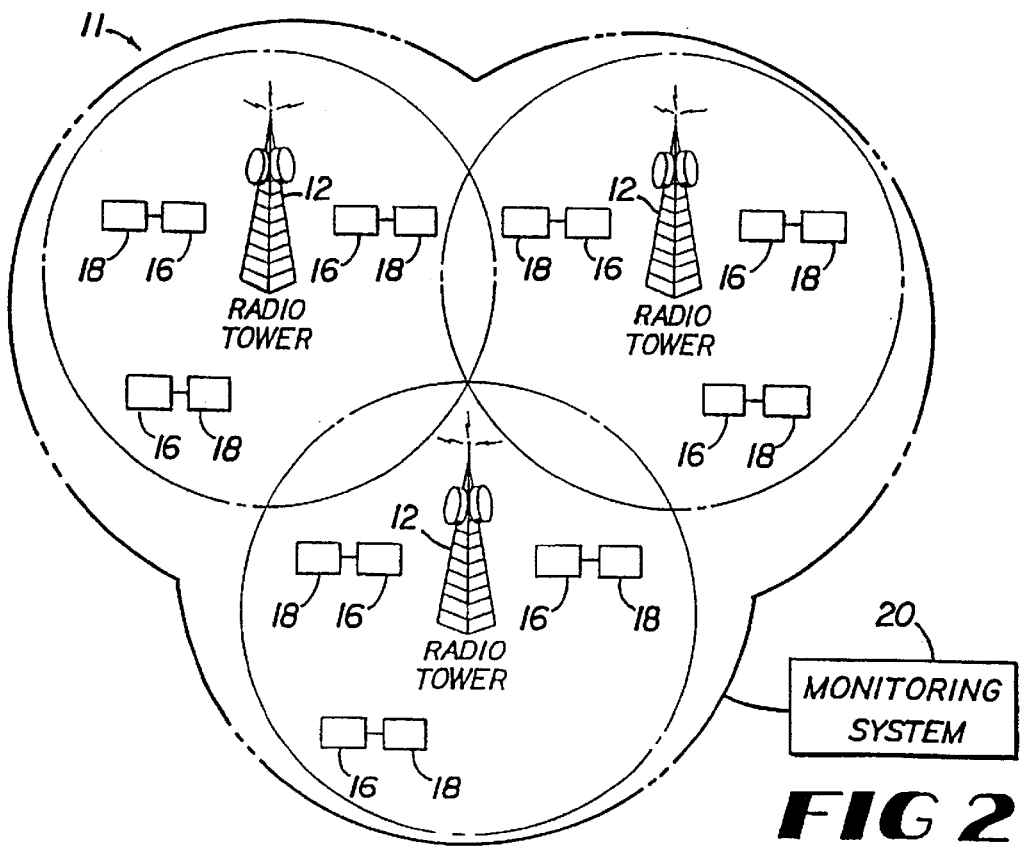
FIG. 2 is a schematic diagram of a second embodiment of a lightning protection system of this invention.

FIGS. 2 and 3 illustrate alternative embodiments of lightning protection systems of this invention where the dangerous atmospheric conditions may be detected and located by a monitoring system 20 located outside the coverage area of sites 12. Monitoring system 20 may be a centralized weather monitoring system, such as. for example, the National Weather Service, the National Hurricane Service, the National Lightning Detection Network, which is owned and operated by Global Atmospherics, Inc., or any alternative centralized weather monitoring and location system. As shown in FIG. 2, in system 11, sites 12 may receive relevant atmospheric data from monitoring system 20, and sites 12 then retransmit broadcast control signals to devices 16 as described above.

As shown in FIG. 3, in system 13, a monitoring system 20 may communicate broadcast control signals to devices 16 via a terrestrial paging network with satellite interconnectivity or via any alternative paging or radio configuration.

It should be understood that lightning protection systems of this invention may be practiced using as connection/disconnection device 16 any appropriate apparatus for electrically disconnecting electric circuits from electrical and electronic equipment 18 and achieving sufficient insulation or physical separation to reduce the likelihood that a power surge by lightning or other electrical disturbance will travel from disconnected external conductors to electrical and electronic equipment 18.

Service Provider/Subscriber System

Lightning protection systems of this invention may be implemented using a service provider/subscriber business scheme. For example, existing service providers, such as, for example, cellular service providers, personal communications service providers, paging service providers, or any alternative wireless or dataline service providers, may include lightning protection services as described above separately or in their bundle of services. Because existing telecommunications service providers already have the necessary infrastructure, equipment, and subscribers, lightning protection systems of this invention may be implemented with very little cost to service providers. Costs for servicing a large number of subscribers may be limited to a single lightning detector 14, an autodialing device, and nominal monthly telephone and pager service fees. Service providers may offer lightning protection services in accordance with lightning protection systems of this invention to individuals and businesses based on a nominal monthly rate. Service providers may initially sell electrical circuit connect/disconnect devices 16 to subscribers or they may give devices 16 away to new subscribers. This service provider/subscriber scheme enables service providers to leverage their existing infrastructure and subscriber base to provide inexpensive and valuable lightning protection services in accordance with lightning protection systems of this invention.

Alternative Electrical Circuit Connection/Disconnection Device Controls

To further enhance the protection of electrical equipment 18, devices 16 may also be controlled in a number of other ways.

FIG. 4 illustrates devices 16 controlled using two remote control approaches. In installations where multiple power outlets must be protected with devices 16, such as stores selling musical, audiovisual, or other consumer electronic appliances, it may be desirable to provide for remote actuation of devices 16. For example, in a music store with multiple electronic instruments connected to a power source and positioned over a large area of floor space, it may be difficult or inconvenient for store personnel, upon learning of electrical storms in the area, to rapidly move about the store to disconnect all of the instruments or ensure that all electrical circuit connection/disconnection devices 16 affixed to each of the outlets in the store are activated to protect the sensitive musical equipment. Moreover, if many such devices 16 are in use, it may be possible for store personnel to inadvertently miss one or more of the devices 16, thereby exposing expensive inventory to potential harm from severe electrical surges. In the system shown in FIG. 4. one remote activation device or transmitter 22, sends out a signal that is received by detectors 24, each of which detectors is connected to electrical circuit connection/disconnection devices 16. The signal from transmitter 22 activates each of the electrical circuit connection/disconnection devices 16, ensuring that all electrical connections between the equipment to be protected and the power grid are simultaneously severed. Devices 16 may be configured to be sensitive to only certain commands from transmitter 22 so that each device 16 can respond independently or in unison with other devices, depending on the signal from transmitter 22. Transmitter 22 could use a variety of conventional technologies, including infrared signals like those used in television remote controls. radio frequency signals, laser beams, and any other control signal.

Alternatively or additionally, each of the protection devices 16 may be connected to a common network which may be controlled by a central control device 26 such as a computer or a dedicated control terminal. In this manner, a user may directly control all of the devices 16 in unison, and may activate or deactivate devices 16 independently. Alternatively, the devices 16 may be connected to central control device 26 over the Internet, a local area network, or computer, wireless, cellular or other network topologies.

The various features, control systems and network arrangements described above may be used in combination with each other or in combination with other detection systems such as those described in the '899 patent or as otherwise may be known or later developed.

As illustrated in FIG. 5, protection device 16 may also be controlled by electrical or electronic equipment 19. A communication line 27 may be provided between the electronic equipment (such as a television) 19 and the protection device 16. In this manner, when electronic equipment 19 is switched on or off, it sends a signal to protection device 16 that commands device 16 to interrupt or reconnect the circuit between plug 50 and outlet 52 as appropriate. (Battery or other auxiliary power may be necessary to accomplish this switching when the equipment 19 is not connected to another power source). This approach is advantageous, because it assures that whenever electrical equipment 19 is turned off, its connection to the power grid is completely severed. In essence, this is a manual approach to activating device 16 that is coordinated with the operation of electrical equipment 19. In the system of FIG. 5, device 16 may also be controlled by a detector circuit as described in the '899 patent, other detection circuits and/or any of the other control approaches described below.

As illustrated in FIG. 5, protection device 16 may be supplemented with a surge suppressor 78. Surge suppressor 78 may be any conventional surge suppression device, such as those using metal oxide varistors. Surge suppressor 78 attenuates variations in voltage supplied by plug 50, thereby preventing transient voltages from passing through outlet 52 and damaging electronic equipment 19. Surge suppressors 78 and protection devices 16 may be configured so that a suppressor 78 may be easily removed from device 16 when an indicator signals that suppressor 78 no longer exhibits surge suppressing characteristics and a new suppressor 78 may be inserted into device 16. For example, this functionality may be enabled by housing surge suppressors 78 in a plug-in module 79.

Circuit Interruption Device

FIGS. 6 and 7 illustrate in detail an embodiment 17 of an electrical circuit connection/disconnection device of the type contemplated in this invention and described above as device 16. Device 17 includes rotary block 28, contact rods 30, contact blocks 32 and 34, side supports 36 and 38, motor 40, receiver circuit 42, and batteries 44. Rotary block 28 is a cylinder constructed of a material which is sufficiently insulative to prevent a voltage of 6,000 volts or more from passing through block 28. Block 28 may be made of glass. nylon, plastic or any other appropriate insulative material. The diameter selected for block 28 will depend on the permittivity of the selected material. If block 28 is to be very small in diameter, a low permittivity must be used. In contrast, if block 28 is to be very large in diameter, the material used for block 28 may have a higher permittivity, although the acceptable diameter of block 28 will also be a function of the resulting length of the path (presumably through air or another gas around block 28).

Contact rods 30 are positioned within and along a diameter of block 28. Contact rods 30 extend from one side of rotary block 28 to another and are positioned generally in parallel with respect to each other. Contact rods 30 may be made of brass, aluminum, copper, or any other suitable conductive material. Contact blocks 32 and 34 are positioned adjacent to rotary block 28 such that contacts 31, positioned within contact blocks 32 and 34, correspond to the locations where contact rods 30 protrude slightly from either side of rotary block 28. In this manner, when contact blocks 32 and 34 are adjacent to rotary block 28 and contact rods 30 are aligned with contacts 31, electricity may pass from contacts 31 on block 28 through contact rods 30 to contacts 31 on block 32 and vice versa. As will be readily understood by one skilled in the art, many types of conductors through block 28 may be used, as well as a variety of brushes, springs or other suitable mechanisms acting as contacts 31 to complete the necessary circuits.

Side supports 36 and 38 have holes 46 which receive pins 48 which extend from either side of rotary block 28. Moreover, side supports 36 and 38 are affixed to contact blocks 32 and 34 thereby joining the assembly into one integrated unit as illustrated in FIG. 7. Motor 40 is affixed to pin 48 via hole 46, thereby allowing motor 40 to rotate rotary block 28 as described below. Block 28 could also be rotated through the 90° rotation necessary in other ways, such as by a solenoid acting on a lever arm attached to one of the pins 48.

Motor 40 is connected to and controlled by receiver circuit 42, both of which in turn are powered by batteries 44.

Receiver circuit 42 receives control signals using one or more of the approaches described above.

Referring to FIGS. 6 and 7, to operate device 17, a control signal is received by receiver circuit 42. When the appropriate control signal is received, thereby indicating that the external conductors to electrical equipment 18 and 19 connected to outlet 52 should be interrupted, receiver circuit 42 controls motor 40 (or another rotation mechanism), which rotates rotary block 28 so that contact rods 30 are aligned perpendicularly to a line connecting contacts 31 of block 32 and contacts 31 of block 34. In this manner, the only path between contacts 31 of block 32 and contacts 31 of block 32 is interrupted by the insulative material making up rotary block 28. If and when a control signal indicating that the external conductors may be reconnected to electronic equipment 18 and 19 connected to outlet 52, receiver circuit 42 may activate motor 40 to rotate rotary block 28 into a position where contact rods 30 connect contacts 31 of block 32 and contacts 31 of block 34, thereby providing a direct conductive path between contacts 31 of blocks 32 and 34. FIG. 8 illustrates the relationship between rotary block 28, contact rod 30 and contacts 31 in a connected state. FIG. 9 illustrates this relationship in a disconnected state. Rotary block 28 may have a hand lever 56 which, when pulled, would allow for manual operation of rotary block 28.

Controlling Power and Other Circuits

As illustrated in FIG. 10, device 16 may be connected to conventional plugs 50 and conventional outlets 52 in order to access and control conventional home power supplies and allow conventional electronic devices to be plugged into device 16. In addition, additional lines 53 may be provided to protect modem, cable television, computer network or other electrical paths as may be desired and appropriate.

Gas or Vacuum Relay Disconnect/Connect Mechanism

As illustrated in FIG. 11, the systems of this invention may use a vacuum or gas-filled relay 58. The gas 60 present (or the relative absence of gas in a "vacuum") in relay 58 are sufficiently insulative that the gap 62 between contacts 64 and 66 of relay 58 when it is open cannot be bridged by voltages of 6,000 volts or more. To operate relay 58, receiver circuit 42 receives a control signal in one of the alternative ways described above and activates a relay 58 to separate contacts 64 and 66, thereby interrupting the electrical contact between plug 50 and outlet 52.

Manual Activation

As illustrated in FIGS. 12 and 13, connection and disconnection may be achieved manually. Contact rods 33 housed within insulation block 68 are normally in contact with contacts 31. As shown in FIG. 13, depressing plunger 70 forces compression spring 72 and displacement of insulation block 68 and contact rod 33. Insulation block 68 includes a detente, which at maximum displacement is engaged and held by latch 74. Releasing latch 74 allows device 16 to be reset.

Uninterruptable Power Supply

As illustrated in FIG. 14, a connect/disconnect device 16 may be combined with an uninterruptable power supply 80. Uninterruptable power supply 80 may be any conventional device for providing continued power to an electronic device when the power normally provided through plug 50 to outlet 52 is interrupted either by activation of lightning protection device 16 or failure of power delivery to the local electronic grid. Such power, can be provided, for instance, by batteries, an auxiliary generator, and other energy storage or supply devices, including fuel cells, flywheels, and electromagnetic storage device, or any other alternative method of providing auxiliary power. The combination of uninterruptable power supply 80 and protection device 16 is advantageous because it allows use of device 16 even with electrical equipment 18 that is sensitive to unanticipated interruptions in the power supply. Upon detecting lightning storms in the area or otherwise receiving control signals, device 16 may interrupt the circuit between electrical equipment 18 and 19 and the power grid, thereby eliminating the risk of lightning induced power surges from entering the circuit and damaging the electronic equipment. At the same time, uninterruptable power supply 80 will sense the loss of power and will begin providing continued power to the electronic device thereby avoiding harm that might arise from the sudden and unanticipated deprivation of electrical power. Uninterruptable power supply 80 may operate in a conventional manner, for instance, or activation of the uninterruptable power supply 80 may also trigger software which commands the electronic device to begin a shut-down procedure, thereby assuring that the device is properly shut down rather than shut down by the power failure.

Circuit Interruption Device

Figure 15:
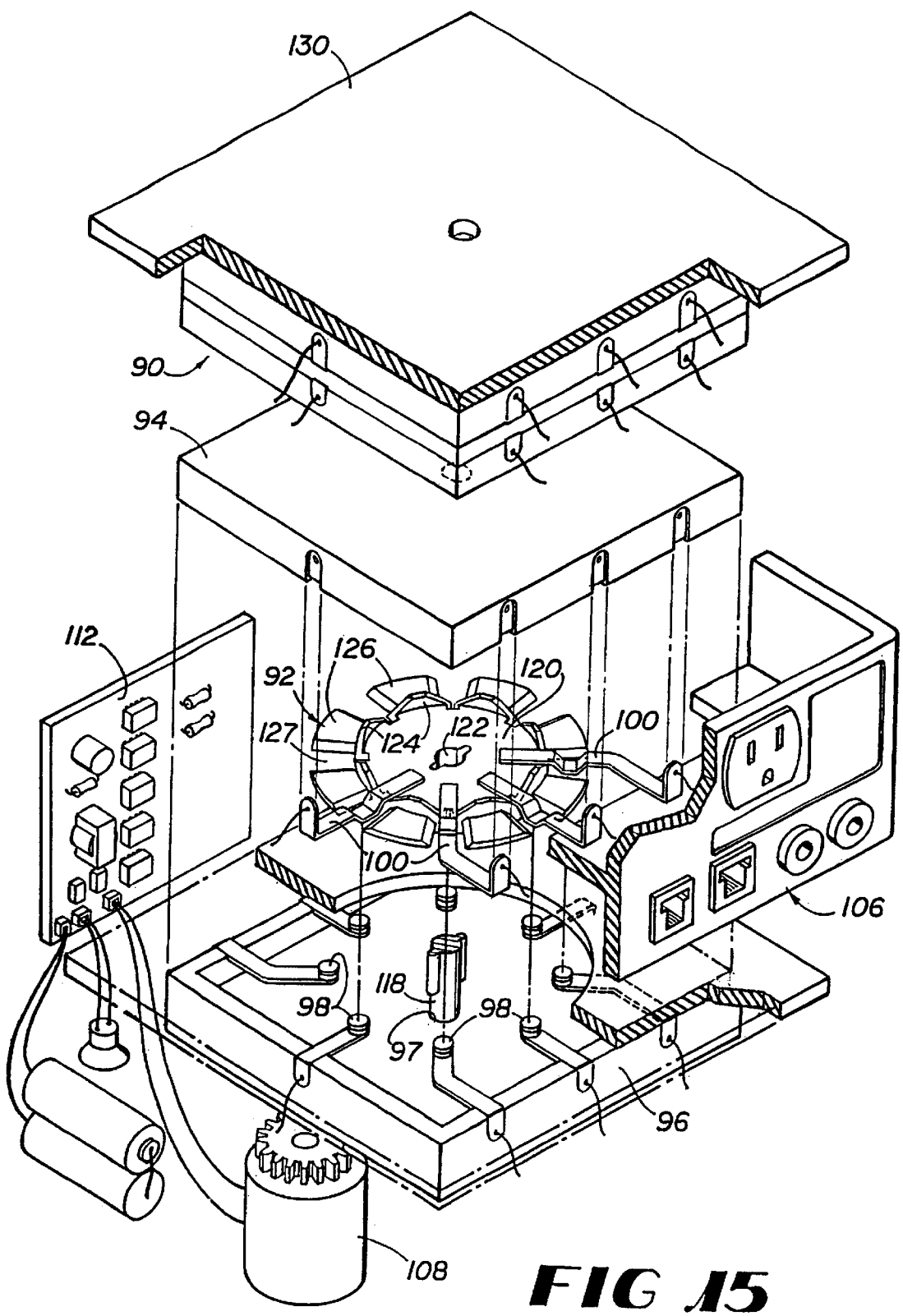
FIG. 15 is an exploded perspective view of another alternative embodiment of a circuit interruption mechanism usable in the systems illustrated in FIGS. 1–5 and other systems.

FIG. 15 illustrates in detail a rotating disk embodiment 130 of an electrical circuit connection/disconnection device of the type contemplated in this invention and described above as device 16. Cam 92 includes disc portion 120 having center hole 122, a plurality of disengagement ridges 124, and a plurality of alternating dielectric tabs 126 and gaps 127. Ridges 124 are integrally attached along the perimeter of disc portion 120 and extend transverse to disc portion 120. Tabs 126 are integrally attached to ridges 124 and extend radially from disc portion 120. Cam 92 may be constructed of a material similar to rotary block 28 of device 17.

Cam 92 is secured between blocks 94 and 96 on shaft 118 such that tabs 126, gaps 127, and the ends of contacts 98 and 100 define circles having an equal radius with respect to holes 122 and 97. As will be appreciated by reference to FIGS. 16 and 17, rotation of cam 92 alternatively permits contacts 100 to mate with contacts 98, or break such contacts when the tabs 126 are between the pairs of contacts 98 and 100.

Interface 106 includes electrical input connections for electrical conductors such as, for example, power sources, datalines, coaxial cable, telephone lines, low voltage control lines, and any other digital or analog electrical source or signal used as an external conductor in electrical and electronic equipment. Each of the plurality of electrical connections are electrically connected to one of the external conductor contacts 98. Interface 106 also includes output connections electrically connected to one of the plurality of equipment side contacts.

Device 130 may also employ an additional rotating disk assembly 90 for use with electrical and electronic equipment having higher voltage power sources, which may be configured as described above and which may operate as described below.

Figure 16:
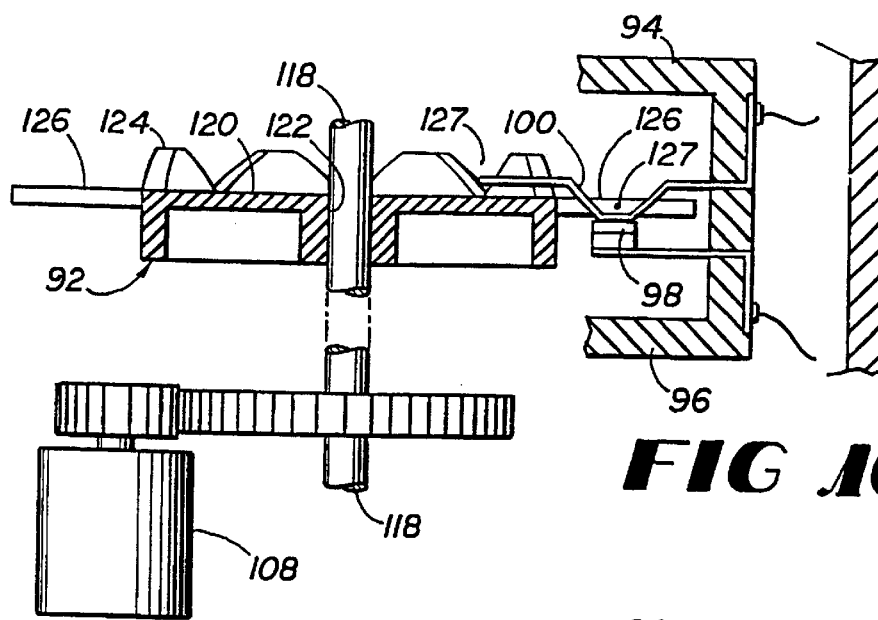
FIG. 16 is a schematic side elevation view of a portion of one set of contacts of the mechanism shown in FIG. 15 closed.
Figure 17:
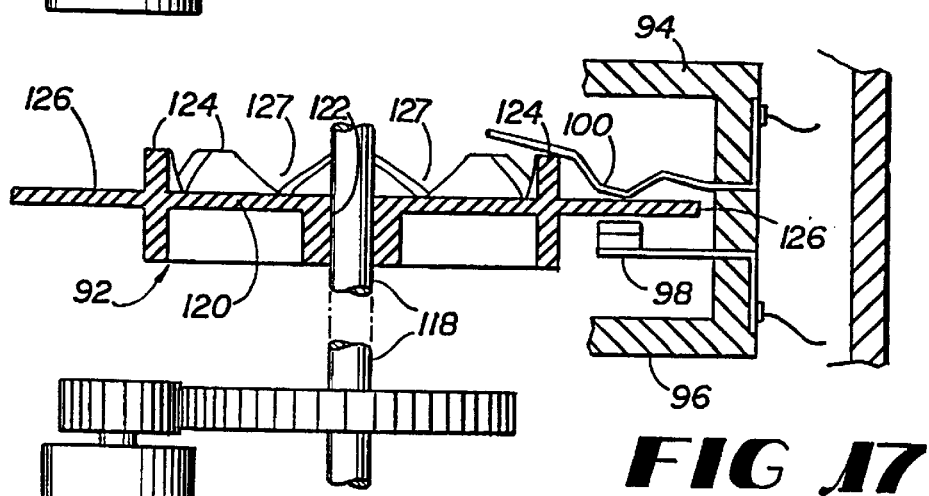
FIG. 17 is a schematic side elevation view similar to FIG. 15 with the contacts open.

Referring to FIGS. 16 and 17, device 130 operates similar to device 17 described above in detail. FIG. 16 illustrates device 130 in a connected state. In the connected state, contacts 100 are positioned between adjacent tabs 126 within gaps 127 and are in electrical contact with each other.

FIG. 17 illustrates device 130 in a disconnected state. When the appropriate disconnect control signal is received, receiver circuit 112 controls motor 108, which rotates shaft 118, which in turn rotates cam 92. As cam 92 is rotated, ridges 124 rotate, thereby forcing contacts 100 to move away from contacts 98. At the same time, tabs 126 are interposed between contacts 98 and 100 thereby providing sufficient separation to prevent voltages of 6,000 volts or more from passing through tabs 126. When the appropriate reconnect control signal is received, receiver circuit 112 controls motor 108, which rotates cam 92. As cam 92 is rotated to the connected state shown in FIG. 16, ridges 124 and tabs 126 are removed from between contacts 98 and 100 and the pair of contacts again mate.

Multiple Pole Single Throw Relay Disconnect/Connect Mechanism

Figure 18:
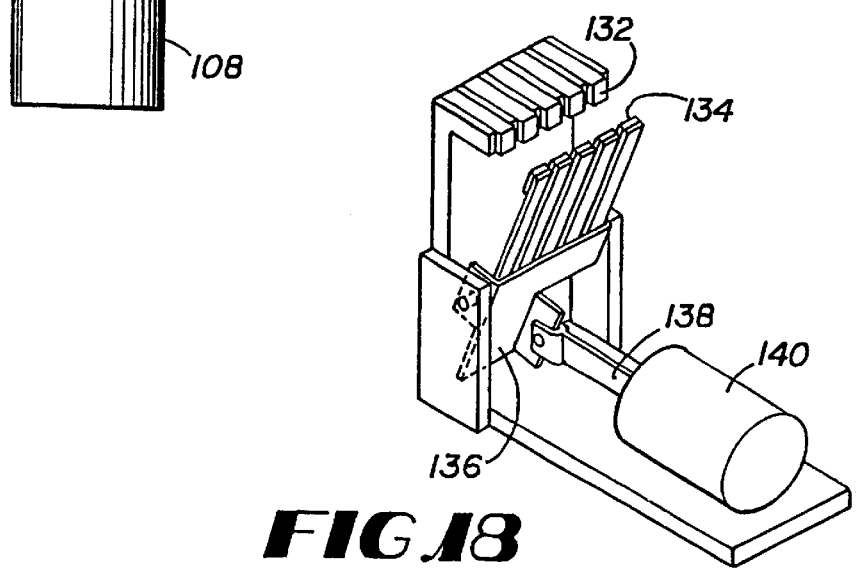
FIG. 18 is a perspective view of another alternative embodiment of a circuit interruption mechanism usable in systems illustrated in FIGS. 1–5 and other systems.

As illustrated in FIG. 18, a device 16 may also use a multiple pole single throw relay for the disconnect/connect mechanism. In the connected state, the relay provides electrical connectivity between the electrical or electronic equipment 18 and 19 and all external conductors that are electrically connected to equipment side contacts 132. Equipment side contacts 132 are connected to external contacts 134, which make electrical contact with lever member 136 when the relay is in the closed position. Lever member 136 may be pivotally attached to plunger 138, which moves in and out of solenoid 140 in response to activation of solenoid 140. When the receiver circuit receives a control signal as described above, movement of plunger 138 along the axis of solenoid 140 causes lever member 136 to separate contacts 134 from contacts 132 a distance sufficient to prevent at least 6,000 volts from bridging the gap between contacts 132 and 134.

As will be appreciated by those skilled in the art, numerous modifications can be made in this invention without departing from the spirit of the invention as described and illustrated here or the scope of the following claims.

I claim:

1. A lightning protection system, comprising:
   a. a regional transmitter for transmitting a control signal;
   b. a plurality of receivers for receiving the control signal and generating a switching signal; and
   c. at least one interruption device connected to each receiver for interrupting at least one electric circuit in response to the switching signal from the receiver to which it is connected.

2. The system of claim 1 wherein the control signal is an infrared signal.

3. The system of claim 1 wherein the control signal is a radio frequency signal.

4. A lightning protection system, comprising:
   a. a weather monitoring system for detecting dangerous atmospheric conditions in a geographic area;
   b. a plurality of regional transmitters for transmitting control signals to at least the geographic area when the weather monitoring system detects dangerous atmospheric conditions in the geographic area;
   c. a plurality of receivers within the geographic area for receiving the control signals and generating switching signals; and
   d. at least one interruption device connected to each receiver for interrupting at least one electric circuit in response to the switching signal from the receiver to which it is connected.

5. The system in claim 4 wherein each of the plurality of regional transmitters transmit control signals to a different geographical subset of the plurality of receivers.

6. The system in claim 4 wherein each of the plurality of regional transmitters transmit control signals to a different geographical subset of the plurality of receivers using a common control signal.

7. The system in claim 4 wherein the weather monitoring system receives locations of dangerous atmospheric conditions from a weather notification service.

8. The system in claim 7 wherein the weather notification service is a national weather service and a weather monitoring and notification service.

9. An apparatus for protecting electrical and electronic equipment having at least one electrical input for connecting to at least one external electrical conductor, comprising:
   a. a first electrical contact for electrically connecting the apparatus to the external electrical conductor;
   b. a second electrical contact for electrically connecting the apparatus to the electrical input;
   c. a receiver for receiving control signals; and
   d. an interruption device having a cylindrical insulative block and at least one electrical conductor therethrough for electrically connecting the first and second electrical contacts and rotating the block substantially 90 degrees in response to the control signals such that the first and second electrical contacts are not electrically connected.

10. The apparatus of claim 9 wherein the external electrical conductor provides electrical power.

11. The apparatus of claim 10 further comprising an uninterruptable power supply electrically connected between the second electrical contact and the interruption device for supplying auxiliary power to the electrical input.

12. The apparatus of claim 9 further comprising an electrical surge suppressor connected in series with the first electrical contact and the second electrical contact.

13. The apparatus of claim 12 further comprising a device for measuring the surge suppression characteristics of the electrical surge suppressor and indicating when the surge suppression characteristics reach a predetermined minimum level.

14. The apparatus of claim 12 wherein the electrical surge suppressor employs a replaceable modular metal oxide varistor.

15. A method for a telecommunications service provider to provide lightning protection services, comprising:
   a. providing lightning protection service subscribers with an electrical circuit connection/disconnection device for receiving control signals and interrupting the electrical connectivity between electrical equipment and at least one external conductor;
   b. monitoring weather in a vicinity of a geographic area;
   c. sending the control signals to electrical circuit connection/disconnection devices of subscribers in the geographic area when dangerous atmospheric conditions are near the geographic area; and
   d. charging subscribers for lightning protection services during time periods within which service is provided.

16. A method of protecting electrical equipment from electrical surges and disturbances carried on external conductors, comprising:
   a. detecting the presence of dangerous atmospheric conditions in a specific geographic area;
   b. transmitting control signals to electrical circuit connection/disconnection devices in the specific geographic area, the devices having receivers receiving the control signals and disconnecting the electrical equipment from the external conductors in response to the control signals.

17. A method of protecting electrical equipment from electrical surges and disturbances carried on external conductors, comprising:
   a. receiving notification of the location of dangerous atmospheric conditions in a specific geographic area;

b. transmitting control signals to electrical circuit connection and disconnection devices in the specific geographic area, the devices having receivers for receiving the control signals and disconnecting the electrical equipment from the external conductors in response to the control signals.

18. An apparatus for protecting electrical and electronic equipment having at least one electrical input for connecting to at least one external electrical conductor, comprising:

a. a first electrical contact connected to the external electrical conductor;

b. a second electrical contact connected to the electrical input;

c. a receiver for receiving control signals;

d. a disk with a perimeter having a plurality of insulative tabs that are separated by a plurality of spaces and attached to the perimeter of the disk; and e. a rotating mechanism for positioning the insulative tabs between the first electrical contact and the second electrical contact in response to the control signals.

19. The apparatus of claim 18 wherein the external electrical conductor provides electrical power.

20. The apparatus of claim 19 further comprising an uninterruptable power supply electrically connected between the second electrical contact and the interruption device for supplying auxiliary power to the electrical input.

21. The apparatus of claim 18 further comprising an electrical surge suppressor connected in series with the first electrical contact and the second electrical contact.

22. The apparatus of claim 21 further comprising a device for measuring the surge suppression characteristics of the electrical surge suppressor and indicating when the surge suppression characteristics reach a predetermined minimum level.

23. The apparatus of claim 21 wherein the electrical surge suppressor employs a replaceable modular metal oxide varistor.

* * * * *